Sept. 6, 1927.

E. H. BRISTOL

CONTROLLING INSTRUMENT

Filed July 21, 1926   3 Sheets-Sheet 1

1,641,944

Inventor:
Edgar H. Bristol

Sept. 6, 1927.  
E. H. BRISTOL  
CONTROLLING INSTRUMENT  
Filed July 21, 1926  
1,641,944  
3 Sheets-Sheet 2

Inventor:  
Edgar H. Bristol,  
by Emery, Booth, Janney & Varney  
Attys.

Sept. 6, 1927.   E. H. BRISTOL   1,641,944
CONTROLLING INSTRUMENT
Filed July 21, 1926   3 Sheets-Sheet 3
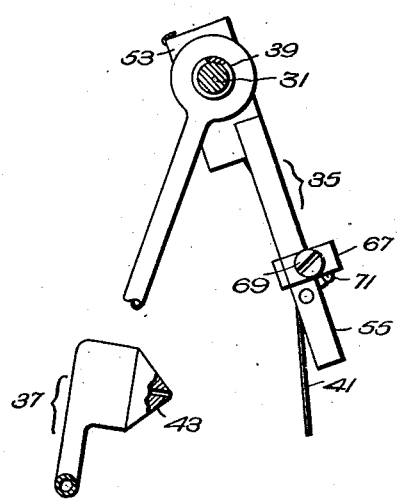
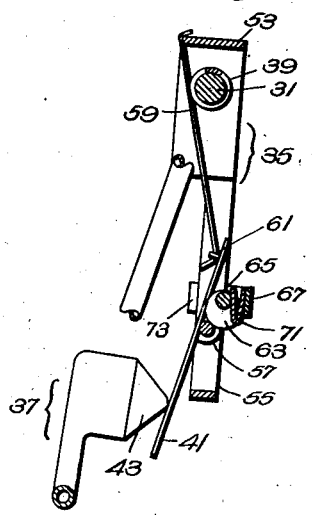
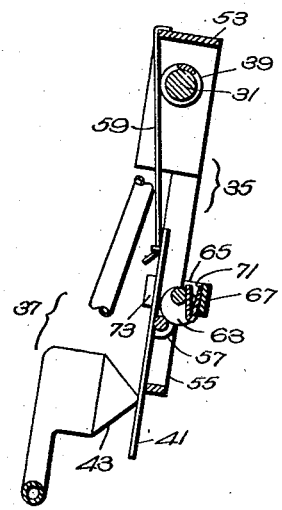
Inventor:
Edgar H. Bristol,
by Emery, Booth, Janney & Varney
Attys.

Patented Sept. 6, 1927.

1,641,944

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

CONTROLLING INSTRUMENT.

Application filed July 21, 1926. Serial No. 123,957.

This invention relates to controlling instruments and the object is to provide certain improvements applicable to instruments of the type wherein the operation of a valve couple, working usually in response to the fluctuations of some variable condition, such as pressure or temperature, controls the flow of a fluid under pressure, which may be a motive fluid to operate a servo-motor the action of which may induce some desired change in the varying condition.

My invention will be understood from the appended claims after consideration of the following description of the illustrative embodiment shown by way of example in the accompanying drawings, wherein:

Fig. 4 is an elevation, with parts broken away, of the control couple; and

Figs. 5 and 6 are similar views, with parts in section, showing different positions of the control elements.

Figure 1:
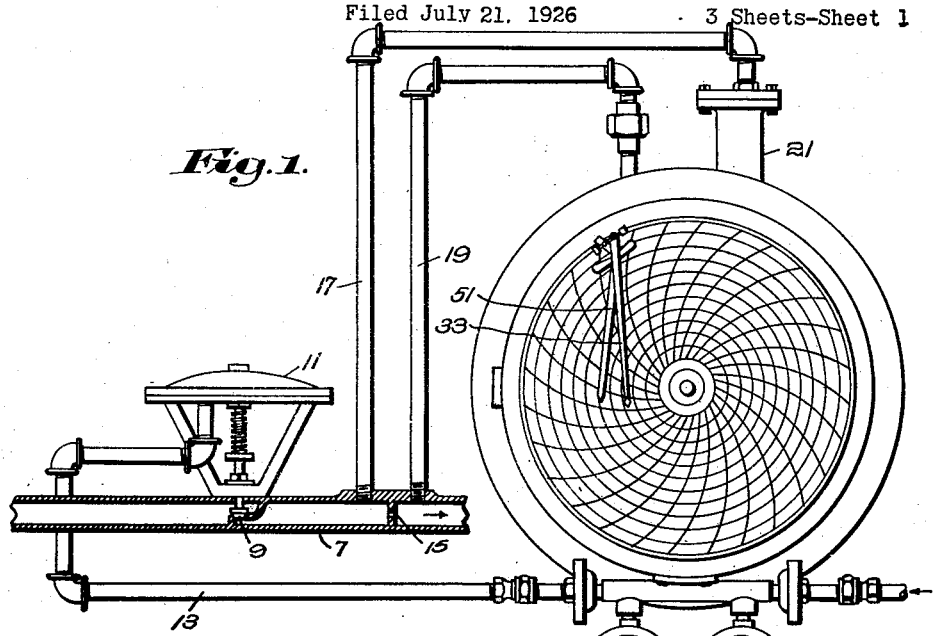
Fig. 1 is a diagrammatic view, partly in section, of a control installation utilizing a form of my invention.

Referring to Fig. 1 of the drawings, I have there shown diagrammatically an installation whereby the flow of fluid in a conduit 7 is automatically controlled. Such flow of fluid is controlled by a valve 9 which may be operated by a servo-motor, herein shown as a diaphragm motor 11 operated by compressed air delivered through pipe 13, the arrow at the lower right hand side of the figure indicating the ingress of air. The rate of flow in the conduit 7 may be controlled by operation of the valve 9 in response to variations in the actual rate of flow of the fluid passing the same. The rate may be measured by means of an orifice plate 15 installed at the downstream side of the valve, from opposite sides of which plate the pipes 17 and 19 lead respectively to the high and low pressure sides of a mercury U tube 21 which forms a part of an instrument of the float gage type and which may be of a construction substantially similar to that shown in my Patent No. 1,592,415, dated July 13, 1926, and which it will be unnecessary to describe herein. The float in the high pressure side of the tube may operate (see Fig. 2) a shaft 23 on which is a crank 25 connected by a connecting rod 27 to a parallel crank 29 (see Fig. 3) which is adapted to turn the shaft 31 of the recording pen 33 and which has a portion located at the further side of control element 35, the latter mounted to swing about shaft 31 so that when the crank 29 moves away from the reader in Fig. 3 it will permit the control element 35 similarly to move toward the cooperating control element 37 under the influence of a spring 39 and when the crank moves toward the reader it will retract control element 35 against the action of the spring. The control element 35 includes a valve proper 41 which finds a seat on a nozzle 43 which forms a part of element 37, the nozzle having an exhaust port or bleed for pressure fluid from the control head 45 (see Fig. 2). The general operation and construction of this control head and of the connections therefrom to the nozzle 43 may be as shown and described in the patent to Arnold M. Dixon, No. 1,582,868, dated April 27, 1926, and need not be herein fully described.

For the purposes of the present description it will be sufficient to outline in a general way the operation of the instrument. When the rate of flow increases and the differential pressure set up by the orifice plate 15 increases, the valve 41 is swung toward the left in Fig. 2 and may make contact with the nozzle 43 so that the control valve couple is closed, ending the exhaust of air through the nozzle 43. The diaphragms 47 of the control head 45 then expand, cutting off the supply of compressed air from the pipe 13 to the diaphragm motor 11 and permitting the air in the motor to exhaust therefrom and the valve 9 to close. As the rate of flow of fluid in the conduit thereafter decreases, the valve 41 is moved toward the right in Fig. 2, the valve couple opens, air exhausts from the nozzle 43 and from the diaphragms 47, these diaphragms collapse and compressed air is admitted to the diaphragm motor 11 to open the valve 9.

In the preceding paragraph I have described the operation of the device for completely open and completely shut positions of the valve couple 35—37 and corresponding to fully open and fully shut positions of the valve 9. In certain applications, as, for instance, the one illustrated, it is desirable to maintain the valve 9 in a more nearly balanced condition, that is, to throttle the valve more or less as may be required. This may be effected by a corresponding throttling of the control valve couple. The example of my invention herein shown is adapted to obtain this effect and I have herein shown the valve 41 (see Fig. 4) as adapted to approach the nozzle 43 in an oblique position as there shown and to make contact with the nozzle at one side of the seat, as shown in Fig. 5, and then to roll or swing to the shut position shown in Fig. 6, gradually throttling the exhaust port of the nozzle during such action. It will be understood that in operation the extreme position of Fig. 6 may not be reached.

Figure 3:
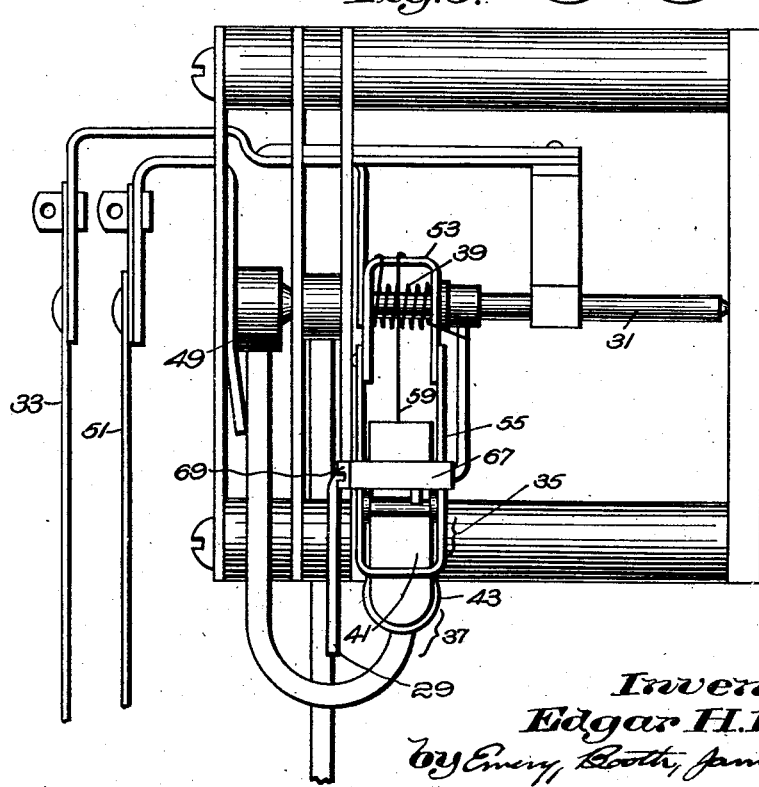
Fig. 3 is a view on an enlarged scale of the governing mechanism which appears at the upper left hand portion of Fig. 2, as seen from the right in Fig. 2.

I shall next describe in detail the particular mechanical construction herein shown. Referring to Fig. 3, as there seen, the nozzle 43 is mounted on a short hollow shaft 49, as in the Dixon patent referred to, which turns about the same center line as the shaft 31 and the nozzle thus swings through radial positions about the center line of that shaft but may be adjusted to desired angular position thereabout as by means of the set lever or hand 51 secured to shaft 49 and projecting over the face of the instrument in proximity to the pen 33. The valve seat at the end of the nozzle 43 is preferably in a plane radial to the shaft 31. The cooperating valve element 35 may comprise a U-shaped member 53, the legs of which are journaled on the shaft 31 and which provides a bearing for the spring 39 coiled about that shaft, and a narrower U-shaped member 55 projecting therefrom, that face of which lies toward the nozzle 43 preferably being disposed in a plane substantially radial to the shaft 31 for the purpose hereinafter made plain. The valve 41 may consist of a light strip of metal having (see Figs 5 and 6) ears 57 between its ends pivoted to the legs of the U-shaped member 55 and its lower end projects outwardly to cooperate with the nozzle 43 toward which it is pressed to a normal position oblique to the radial by means of the wire spring 59, one end of which finds a bearing on the cross-bar of the U-shaped member 53 and the other end of which is hooked through an eye 61 on the upper end of the valve strip 41. The cross-bar of the U-shaped member 55 may provide a stop against which the valve 41 is pressed by the nozzle 43 which, as the valve-carrying element 35 moves toward the left from the position of Fig. 4, makes contact with said valve, as illustrated in Fig. 5, and gradually presses it toward the position of Fig. 6. In the position of Fig. 6 the valve 41 is in a radial position and consequently rests flat against the radial valve seat in nozzle 43. The cross-bar of the U-shaped member 55 preferably engages valve 41 closely adjacent the nozzle 43 so that the valve is maintained substantially rigid in the position shown.

I shall next briefly describe the operation of the control couple with reference to Figs. 4, 5 and 6. The nozzle 43 may be adjusted to any desired angular position corresponding to the point where it is desired to have the control operate. This adjustment, which is effected by swinging the nozzle about the center line of the shaft 31, will always leave the valve seat thereon in a radial plane. The parts of the cooperating member 35 being in the position shown in Fig. 4 we may assume that the measuring instrumentality, herein the mercury U tube gage, acts to swing the crank arm 29, as shown in Fig. 3, away from the reader in that figure or toward the left in Figs. 4, 5 and 6, permitting the spring 39 to swing the member 35 as a whole about the center line of shaft 31 and toward the nozzle 43. In this movement the U-shaped member 55 in which the valve 41 is pivoted is always in a generally radial position so that if at any time the valve where moved to the position of Fig. 6 it itself would be radial. In other words, the valve member 35, considered as a whole, is always moving along a tangent to the arc of swing perpendicular to the radial position of the valve seat and this is true whatever the relative positions of the two elements 35 and 37. As the swinging movement of the element 35 continues, the valve 41 makes contact with the nozzle 43, as shown in Fig. 5, and upon still further movement of the valve-carrying member the nozzle gradually swings the valve 41 against the force of spring 59 toward the radial position, the valve closes on the valve seat with a swinging or rolling motion and in doing so gradually throttles the escape of air through the exhaust port in the nozzle 43. If the parts reach the position of Fig. 6 and the differential pressure still increases, the crank 29 may continue its movement, moving away from the valve-carrying member 35 which remains in the position shown in Fig. 6. As the control mechanism comes into play, the valve-carrying member 35 swings again to the right and the reverse operation takes place, the port in the nozzle 43 being gradually opened, the parts passing from the position of Fig. 6 to the position of Fig. 5 and finally to the position of Fig. 4. It will be understood, however, that the extreme positions may not be called for under many conditions and that the relative position of the parts will represent some variation of the general position shown in Fig. 5 with the exhaust port more or less throttled, producing a corresponding throttled condition of the controlled valve 9.

I have already pointed out that the construction is such that the operation of the parts as the valves meet one another is the same whatever the angular positions of the two couples about the center line. This permits the organization of the parts for swinging movement about a common center line with its many advantages, among which may be mentioned the adaptability to organization in a combined recorder-controlled structure, as illustrated in Fig. 1, in which a record of the variable in question, herein the differential pressure, is recorded by pen 33 on the usual polar chart.

Suitable means may be provided for adjusting the normal position of the valve 41, that is, the angularity thereof relative to the radial, and I prefer to organize this adjusting means so that it is accessible from the side, that is, from one side of the general plane in which the control elements swing. Thus, referring to Fig. 2, it will be obvious that such adjustment may be readily effected if the parts may be manipulated by means of a portion exposed toward the front of the instrument, whereas if such part were exposed at the front or back of the element 35, that is, either in a direction toward the crank 25 or in a direction toward the element 37, it would be much less convenient of access.

Figure 2:
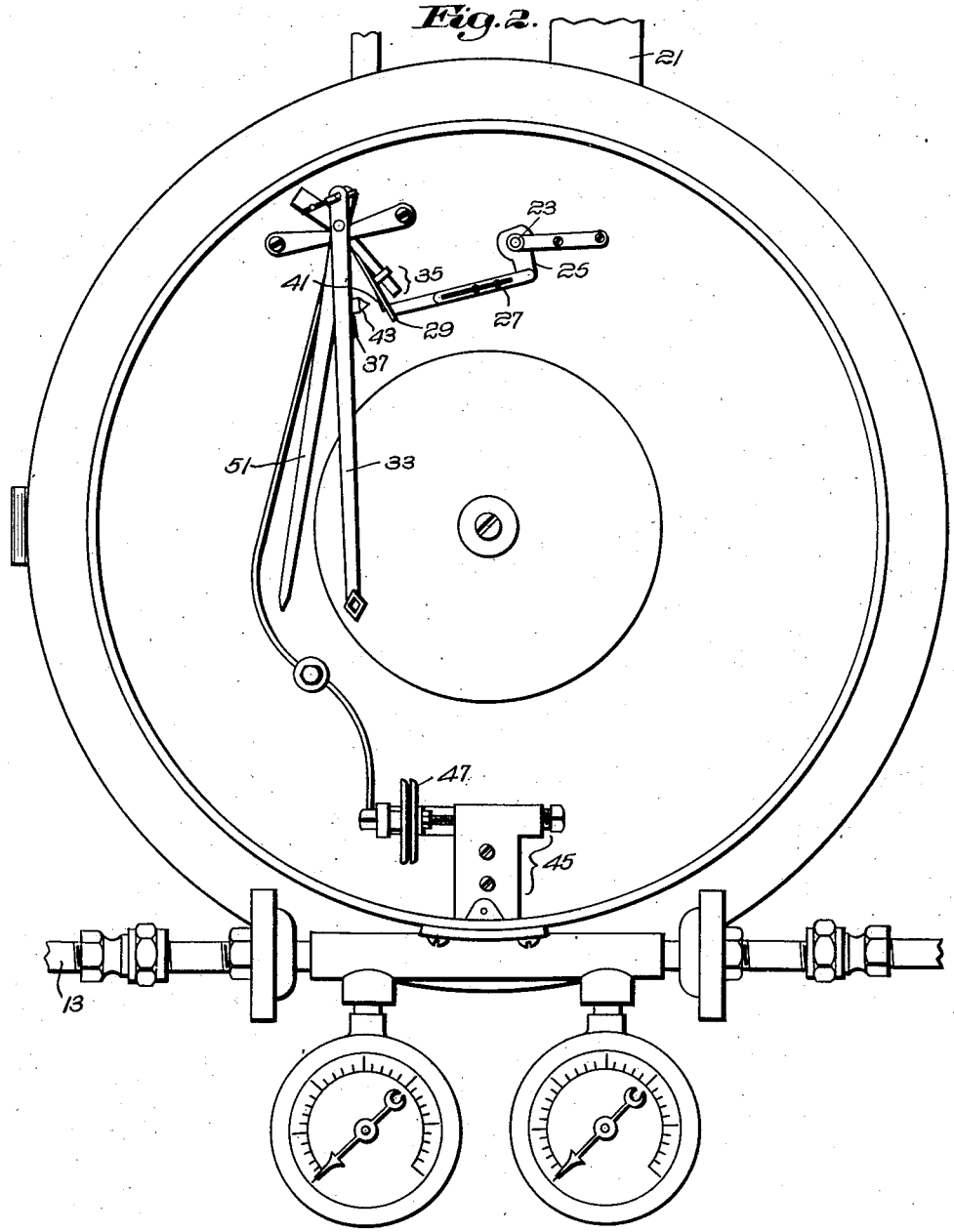
Fig. 2 is a front elevation of the control instrument with the cover and dial plate removed.

The adjusting means here shown takes the form of an eccentric or cam 63 adapted to bear against the upper end of the valve strip 41 to swing it counterclockwise against the action of spring 59. This eccentric is mounted on an arbor 65 having bearings in the sides of the valve-carrying frame which is herein shown as extended for that purpose by means of a U-shaped strap 67, the legs of which are secured to the legs of the U 55 in a relatively perpendicular plane. One end of the arbor 65, that nearer the reader in Fig. 4 and toward the front of the instrument and at one side of the general plane in which the elements of the control couple swing, may be formed as an enlarged head 69, as shown in Fig. 4, which may be provided with a screw-driver slot by which the cam may be turned to swing the valve 41 to the desired initial position. It will be obvious that a screw-driver may be very readily inserted from the front of the instrument, as shown in Fig. 2, to effect this adjustment.

A suitable detent may be utilized for holding the cam 63 in adjusted position and I have herein shown a V-shaped spring wedge 71 which is pressed into position between arbor 65 and the web of the U-shaped member 67 and thus forms a frictional detent resisting movement of the arbor 65 but permitting it to be turned intentionally. The arm of the spring which bears against the shaft 65 may be interposed between the side face of the cam 63 and the adjacent leg of the U-shaped member 69 and may thus co-operate with the head 69 in positioning the arbor. Thus, movement of the arbor with its cam away from the reader in Figs. 4, 5 and 6 is prevented by the head 69 while movement thereof toward the reader is prevented by the arm of the spring 61 interposed between the leg of the U and the side of the cam. One of the legs of the U 67 may be extended as indicated at 73 to provide a bearing to be engaged by the crank 29 so that the latter does not interfere with the valve 41.

In the case of an instrument like that described wherein the controlling fluid is under positive pressure, the exhaust issues from the port in the nozzle 43 as a jet, blowing against the valve 41 as the latter approaches it. With the arrangement shown wherein the valve approaches an oblique position and rolls shut the difficulties sometimes arising from this condition are obviated.

I have described the construction herein shown wherein the valve-carrying member 35 is automatically moved in accordance with the fluctuations of a variable and wherein the member 37 is manually adjusted but it is obvious that it is the relative movement of the parts which is significant and either or both parts may be moved in response to one or more variables. I have also described an installation wherein the control is effected in accordance with the variations of the differential pressure indicating changes in the rate of flow of the fluid but the control may be in response to any other variable, as, for instance, the control of temperature conditions as in an installation similar to that shown in my Patent No. 1,405,181, January 31, 1922. I have also described an installation wherein the fluid which operates the servo-motor 11 is under positive pressure but the invention may be embodied in installations wherein the servo-motor operates under negative pressure or vacuum as in said patent.

I have described in detail the illustrative embodiment of my invention which is illustrated in the accompanying drawings in order that the principles exemplified thereby in one particular form might be readily understood and not because the details so fully herein described are essential as obviously the construction and arrangement of parts might be widely varied without departing from the principles of the invention.

What I claim as new and desire to secure by Letters Patent I shall express in the following claims:

1. In an instrument of the class described a pair of control elements mounted for relative movement through swinging movement about an axis and comprising a ported element having a valve seat substantially radially disposed, the cooperating element carrying a pivoted, spring-pressed valve normally disposed obliquely to the radial.

2. In an instrument of the class described a control couple comprising a ported member arranged to swing about a center line and having a substantially radial seat, a cooperating member adapted to swing about the same line, a device responsive to the fluctuations of a variable to move one of said elements, and a valve carried by said second member and yieldably projecting therefrom at an angle to the radial.

3. In an instrument of the class described a control couple comprising a ported member arranged to swing about a center line and having a substantially radial seat, a cooperating member adapted to swing about the same line, a device responsive to the fluctuations of a variable to move one of said elements, and a valve carried by said second member and yieldably projecting therefrom at an angle to the radial, said member providing a stop supporting the valve in a radial position when displaced by the ported member.

4. In an instrument of the class described a control couple comprising a ported member arranged to swing about a center line and having a substantially radial seat, a cooperating member adapted to swing about the same line, a device responsive to the fluctuations of a variable to move one of said elements, and a valve movably carried by said second member and adapted first to make contact laterally with said ported member and then to swing or roll into position, closing the same on continued approach of said elements.

5. In an instrument of the class described a control couple comprising a control element having a valve seat and a cooperating element, the two being arranged to approach perpendicularly in the operation of the couple, said second element carrying a valve yieldingly projecting obliquely from one side of the path of approach.

6. In an instrument of the class described a control couple comprising a ported element and a cooperating element carrying a flap valve, and means to move said elements together and apart constantly with the fluctuations of a variable, said valve being yieldably extended obliquely to the path of approach.

7. In an instrument of the class described a ported element, a cooperating element carrying a valve, means to move said elements together and apart, said valve being pivoted to its carrying element at one side of the path of approach, means normally yieldably holding said valve obliquely and means to adjust the angle of the valve.

8. In an instrument of the class described a ported element, a cooperating element carrying a valve, means to move said elements together and apart, said valve being pivoted to its carrying element at one side of the path of approach, means normally yieldably holding said valve obliquely and stop means for the valve when it is displaced by said ported element to a position substantially normal to said path.

9. In an instrument of the class described a ported element, a cooperating valve-carrying element, means to move said elements together and apart, a valve yieldably projecting from said carrying element from one side of the path of approach and normally extending obliquely thereto and means on said second element adjustable to change the normal angle of the valve relatively thereto.

10. In an instrument of the class described a ported element, a cooperating valve-carrying element, means to move said elements together and apart, a valve yieldably projecting from said carrying element from one side of the path of approach and normally extending obliquely thereto and a device on said element having a manipulating portion presented at the side whereby it may be adjusted to change the normal angle of the valve relatively thereto.

11. In a structure of the class described a movable frame, a valve carried thereby and normally resiliently projecting obliquely therefrom and a cam bearing against the valve having a shaft journalled in the frame with one end projecting laterally for manipulation thereof.

12. In a structure of the class described a movable frame, a valve carried thereby and normally resiliently projecting obliquely therefrom, a cam bearing against the valve having a shaft journalled in the frame with one end projecting laterally for manipulation thereof and a detent comprising a spring interposed between said shaft and a portion of the frame.

13. In a structure of the class described a movable frame, a valve carried thereby and normally resiliently projecting obliquely therefrom, a cam bearing against the valve, a shaft for the cam journalled in said frame having at one end a head external to the frame and formed to receive a rotating means and a detent comprising a spring compressed between said shaft and a portion of the frame and also lying adjacent said shaft between a side of the cam and another portion of the frame and cooperating with said head to position the shaft.

14. In a structure of the class described a movable frame, a strip one end of which forms a valve pivoted to the frame between its ends, a spring normally projecting said end obliquely outward, said frame providing a stop for said strip when displaced against the action of the spring, a cam journalled in the frame and bearing against the other end of the strip whereby to adjust the position thereof and means accessible at the side of the frame for turning the cam.

In testimony whereof, I have signed my name to this specification.

EDGAR H. BRISTOL.